United States Patent Office 3,194,730
Patented July 13, 1965

3,194,730
PESTICIDAL FORMULATION CONTAINING A
COMPLEX OF CaCO₃ AND SiO₂
Joseph W. Nemec, Rydal, and Edward A. Nolan, Jr., Philadelphia, Pa., assignors to Rohm & Haas Company, Philadelphia, Pa., a corporation of Delaware
No Drawing. Filed Aug. 4, 1961, Ser. No. 129,225
11 Claims. (Cl. 167—42)

This invention concerns a formulation for pesticides. It more particularly comprises a specific carrier that has outstanding utility in applications with pesticides that are normally sensitive to alkaline conditions. This carrier, while being useful with a great variety of pesticides, is particularly effective when used with pesticides that normally suffer degradation and loss or decrease of activity when employed with carriers possessing some alkalinity as measured by the pH of an aqueous suspension. The present carrier is particularly adapted for use with pesticides, either liquid or solid, that can be used in wettable powder formulations.

In order for a pesticidal carrier to be acceptable for widespread use it must not appreciably reduce in any way the activity of the pesticide it carries. It must also be substantially non-phytotoxic and, when formulated with the pesticide, yield a non-phytotoxic product in order that there will not be produced any adverse effects to plant life with which it will come in contact during its use as a pesticidal carrier. The carrier should have great adsorptivity for the proposed pesticide it will carry, and it must be substantially wetted when employed in the standard and usual wettable powder formulations. The carrier and the formulated product made therefrom must give acceptable results regarding its suspendibility in an aqueous or solvent system, i.e., the carrier when properly formulated must be able to suspend itself and the pesticide it bears in order that there be no apprecible tendency for the particles to agglomerate. It is further required or at least highly desirable that the carrier and the formulated product be free-flowing or substantially so in order that its routine handling will offer no serious detrimental inconveniences and so that repeated formulations will be expedited. Other desirable characteristics will be apparent hereinafter.

While many of the known carriers posses some of the necessary characteristics mentioned above, it is the usual observation that one and frequently more of the vital requirements are lacking in the known carriers. This is particularly so where applications of compounds, either solid or liquid, that are sensitive to basic conditions are employed. Particularly offensive has been the tendency of known carriers to seriously reduce the pesticidal activity of the pesticide it bears when that pesticide is one of the group to be sensitive to bases. In the past, when base-sensitive pesticides have been contemplated for wettable power formulations, it has been necessary to supply carriers that were known to be acidic or having a pH no higher than neutral. Unfortunately, the acidic carriers do not posses all of the necessary characteristics mentioned above. In many instances, the products when formulated on an acidic carrier are excessively phytotoxic or have very low absorptivity characteristics or both. It can be readily seen that in instances where base-sensitive pesticides were to be employed in wettable powder formulations that a special type acid carrier need be employed, and carriers having a pH above neutral are substantially excluded. It is an object of the present invention to provide a pesticidal formulation comprising a pesticide and a carrier suitable for a wide range of pesticides, particularly materials, both liquids and solids, that are known to be base sensitive. It is a further object of this invention to provide a pesticidal formulation in which the carrier does not adversely affect the pesticidal activity of the pesticide it carries, and which, when employed to produce a wettable powder, yields a product which is free-flowing and possesses excellent stability, low phytotoxicity, and satisfactory wettability and suspendibility. Other objects of the invention will be apparent hereinafter.

The unique pesticidal carrier used in this invention is prepared by reacting carbon dioxide with diatomaceous calcium silicate that has been produced by the reaction of hydated lime and diatomaceous earth. A commercial form of this diatomaceous calcium silicate is sold as Micro-Cel (Johns Manville). The diatomaceous calcium silicate just referred to may be used in some cases as a pesticidal carrier, but, by and large, its use as a carrier for certain types of pesticides is seriously hampered by its having several of the defects previously mentioned, particularly that of degrading the pesticide. The present pesticidal carrier is prepared by reacting the commercial diatomaceous calcium silicate with carbon dioxide supplied in its gaseous, liquid or solid states. It is preferred to employ carbon dioxide in its gaseous state, in which case the diatomaceous silicate is agitated in a reactor in an atmosphere of carbon dioxide. It is also possible to conduct the reaction by introducing gaseous carbon dioxide beneath the surface of the diatomaceous silicate and causing the gas to bubble up through the silicate. It is also possible to conduct the present reaction by putting the diatomaceous silicate and Dry Ice (solid carbon dioxide) in a reactor. In this instance, it is preferred to introduce Dry Ice intermittently in small pieces in order that the reaction be conducted at a desirable rate with maximum use of reactants. It is further possible but less desirable to employ liquid carbon dioxide in the reaction system, but, in this case, it is necessary to employ pressures greater than atmospheric in order to retard the natural tendency of the liquid carbon dioxide to change to its normal gaseous state and escape from the reaction system. The preferred method is the one that encompasses the use of gaseous carbon dioxide.

It has been repeatedly established that there is a definite chemical change in the diatomaceous calcium silicate in that an appreciable exothermic heat of reaction is observed and the physical and chemical properties of the product are significantly distinct from those of the original diatomaceous calcium silicate.

It is believed from the best experimental evidence that the carbon dioxide reacts with the diatomaceous calcium silicate to form an intermolecular complex of calcium carbonate and silicon dioxide which cannot be physically separated. It has also been determined that the carbonate ions are aligned according to the aragonite rather than the calcite pattern. It is believed that the carbonate ions may have definite positions in the silicon dioxide lattice. It is certain that the diatomaceous calcium silicate after reaction with carbon dioxide appears as a unitary product of great stability and sorptivity.

The present reaction requires the presence of water. When there is present substantially less than 2% of water based on the dry weight of the diatomaceous calcium silicate reactant, there is very little reaction. When the weight of water ranges by weight between 2 to about 5% of the silicate reactant, there is a moderately rapid reaction. The preferred range is about 5 to 20% of water based on the weight of the silicate reactant, but percentages up to about 80% of water can be conveniently used. Actually, the reaction will occur even if so much water is present that a slurry is formed with the silicate reactant. The preferred amounts of water of 5 to 20% by weight of silicate reactant are based on the fact that the silicate reactant most rapidly reacts when the amount of water is present and yet it remains free-flowing which facilitates its handling.

There will usually enter into the reaction about 7 to 25 parts by weight of carbon dioxide per 100 parts of the diatomaceous calcium silicate although there may be present in the reaction medium appreciably greater amounts of carbon dioxide.

The present reaction is characterized by an exothermic heat of reaction which, in most instances, is so appreciable that the temperature may rise 35 to 80° C. or more. The actual extent of the exothermic reaction will, of course, be based to some extent on the rate at which the carbon dioxide is introduced into the reaction system, the state of the carbon dioxide used, and the amount of water present. The reaction is conducted until the abatement of the exothermic heat of reaction is observed and the uptake of carbon dioxide ceases and this may illustratively be from about one to eight hours. The present reaction may be conveniently conducted in a weighed reactor and continued until no more carbon dioxide reacts as measured by no further increase in weight.

Temperatures appreciably below the boiling point of water are preferred or there may be a substantial loss of water and carbon dioxide. The reaction will occur to an appreciable extent as low as about 0° C. but for maximum results it is preferred to use the range of about 15° to 90° C. In this range the reaction is effectively consummated with maximum employment of reactants. The temperature of the reaction system is generally maintained by the exothermic heat of reaction and may be controlled by conventional methods if necessary or desired. Atmospheric pressure is preferred in most instances, although, a pressure slightly above atmospheric may help to conserve the carbon dioxide. As indicated heretofore, pressure is practically required if the use of liquid carbon dioxide is contemplated. However, there is no noticeable improvement in the quality of the product by the use of pressures greater than atmospheric, and such pressures are used only when substantially complete conservation of reactants is desired and important. At the conclusion of the reaction, the product is ready for use without the necessity of any operations of isolation or purification, except that the water content of the product may be adjusted by conventional methods if and as desired. The process of this invention is characterized by high, substantially quantitative yields and substantially no problems of product isolation.

There are observed several differences between the diatomaceous calcium silicate reactant and that reactant after it has been treated with carbon dioxide or, as it might be said, carbonated.

A significant difference between the carbonated and uncarbonated calcium silicate is that there is an appreciable change in the pH. The pH of the original reactant, as measured by a standard method wherein an aqueous slurry is employed, ranges from about 9.0 to 10.0. The carbonated product, on the other hand, ranges from about 8.4 to 8.8 and is consistently about 0.5 less in pH than the corresponding reactant. The pH of the product is, therefore, still in the alkaline range, nevertheless, while the uncarbonated reactant is unsuitable for use with base-sensitive pesticides, the carbonated product is quite satisfactory. Along with this significant reduction in pH, there is observed a marked reduction in "available basicity" of the product over the reactant, as will be more fully apparent hereinafter. The desired stability of the normally base-sensitive pesticides, when borne on the carbonated carrier of this invention could not have been predicted when considered in the light of the known tendencies of alkaline carriers to adversely affect the pesticidal properties of the pesticides they carry. With the carbonated product of this invention, there is no appreciable degradation of active pesticidal properties of pesticides normally considered to be base sensitive, whereas with the uncarbonated reactant, there is such an appreciable degradation and loss of the desired pesticidal properties that the use of these base-sensitive pesticides with the diatomaceous calcium silicate reactant is seriously restricted.

The property of suspendibility is also noticeably changed by the carbonation process of this invention. While the diatomaceous calcium silicate reactant when formulated, in many cases, has acceptable suspendibility, the carbonated product when similarly formulated exhibits in many cases superior properties of suspendibility, and there is substantially completely lacking any tendency toward agglomerating and subsequent settling, as evaluated in an aqueous system by standard methods.

The carbonated diatomaceous calcium silicate has a larger particle size than the diatomaceous calcium silicate reactant. This property has varying degrees of importance in that it has been noticed in some instances that the phytotoxicity of a carrier is reduced as its particle size is increased. While the pesticidal powder formulated from the silicate reactant is generally not objectionably phytotoxic it is, of course, desirable to improve the non-phytotoxic nature of the formulation, and increasing the particle size is often effective in producing this desired result. In any case, it has been repeatedly determined that the pesticidal powder formulated from the carbonated product has markedly reduced phytotoxicity over that formulated from the uncarbonated reactant. As an indication of the extent of the particle size change, the diatomaceous calcium silicate reactant and carbonated product were evaluated with the standard Fisher Sub Sieve Sizer. According to this evaluation made with several series of independent measurements, the particle size of the silicate reactant varied from 2.2 to 3.3 microns, whereas the particle size of the carbonated silicate product varied from 2.8 to 4.1 microns. In any one series the particle size of the carbonated product ranged from 0.5 to 0.8 micron larger than the silicate reactant. With the increase in particle size of the carbonated product over the uncarbonated reactant, there is also a change in the bulk density. In this respect, employing standard methods and using several series of measurements, the carbonated product ranged from 0.43 to 0.54 gram per cubic centimeter (0.48 average), whereas the uncarbonated reactant varied from 0.31 to 0.38 gram per cubic centimeter (0.35 average).

It is further noticed that, while there will be appreciable variations in physical and chemical properties from sample to sample of the reactant, the carbonated product is considerably more uniform. In other words, the process of this invention tends to minimize the variations in the properties of the reactant.

The desirable properties of sorptivity (absorptivity and adsorptivity) are retained in the product. Also, the product retains the desirable free-flowing characteristics of the reactant. The product, when properly formulated with a pesticide, is characterized by high stability and low phytotoxicity. In other words, while several of the undesirable restrictions of the uncarbonated reactant are altered to such an extent that the product may be used, whereas the reactant could not be, the product retains the desirable features of the reactant.

The process and product of this invention may be more fully understood from the following illustrative examples which are offered by way of illustration and not by way of limitation. Parts by weight are used throughout.

Example 1

A 1 liter round-bottomed flask is fitted with an agitator, a thermometer, a gas inlet tube connected to a carbon dioxide cylinder, and a vent connected to a bubbler. The reactor is charged with 200 parts of Micro-Cel powder and 10 parts of water. The agitator is started and carbon dioxide is fed at such a rate to prevent loss of powder through the vent and to provide only a slight excess of carbon dioxide over that reacting as observed in the bubbler. The temperature of the powder increases from 25° to 70° C. after 40 minutes. After approximately 1½ hours the reaction is complete, as indicated by no further uptake of carbon dioxide. The weight of the carbonated product is 242 parts. This represents a reaction of 16 parts of carbon dioxide per 100 parts of Micro-Cel charged.

*Example 2*

Powdered Dry-Ice (solid carbon dioxide) is added in portions to 1000 parts of Micro-Cel (water content previously adjusted to 10% by weight) contained in a 5 liter round-bottomed flask fitted with an agitator. A total of 250 parts of carbon dioxide is added over a period of 3 hours. The resulting mixture is opened to the atmosphere and agitation is continued for one hour. The final product weight is 1152 parts. Properties of the starting material and the product are as follows:

|  | Starting material | Product |
| --- | --- | --- |
| pH of aqueous slurry | 9.2 | 8.7 |
| Bulk density (grams per cubic centimeter) | 0.35 | 0.52 |
| Average particle size (microns Fisher Sub Sieve Sizer) | 2.2 | 3.1 |

Standard stability tests were conducted with a wide variety of base-sensitive pesticides and these tests served to illustrate the stability of normally base sensitive pesticides when carried by the present carbonated carrier as contrasted with their corresponding instability when borne by the uncarbonated reactant. Both accelerated testing at elevated temperatures and prolonged testing at room temperatures were employed. The testing was conducted on the carrier and pesticide in a conventional dry wettable powder formulation containing in parts by weight about 49 to 84 parts, preferably 64 to 79 parts of the carrier, 15 to 50 parts, perferably 20 to 35 parts, of the pesticides, and a total of 1 to 10 parts, preferably 1 to 3 parts of at least the first member from the class consisting of a dispersing agent and a wetting agent, typically 2 parts of a dispersing agent such as naphthalene sulfonic acid-formaldehyde condensate, and 1 part of a wetting agent such as an alkylphenoxypolyethoxyethanol. The amounts of carrier and pesticide were varied from pesticide to pesticide in order to simulate actual conditions of use based on known recommended dosages of the individual pesticides concerned. The accelerated testing was conducted at 100° C. for one hour and at 60° C. for two weeks. The prolonged testing was run at room temperature for 30 and 40 days, with checks made after five days. In repeated evaluations the carbonated diatomaceous calcium silicate of this invention exhibited surprising superior stability over the uncarbonated reactant of 20 to 75%. In all cases, the carbonated product of this invention gave values indicating that the normally base-sensitive pesticides were actively present in amounts greater than 90% and usually greater than 95% of that present at the beginning of the test. These superior results were observed whether the accelerated or prolonged testing procedure was employed. For instance, using the pesticide 1,1-bis(chlorophenyl)2,2,2-trichloroethanol (Kelthane) in a commercial wettable powder formulation including in parts by weight 72 parts of the carrier, 25 parts of the pesticide, 2 parts of the sodium salt of a copolymer of maleic anhydride and diisobutylene as a dispersing agent, and 1 part of octylphenoxypolyethoxyethanol containing 9.7 ethoxy units as a wetting agent, there was obtained a value of greater than 98% of the active pesticide after both an accelerated and a prolonged test when the carbonated carrier of this invention was used, whereas with the uncarbonated reactant values in the 70's were obtained. Similar results and ranges were observed when the pesticide tested was dinitro(1-methylheptyl)phenyl crotonate (Karathane). When the pesticide tested was O,O - dimethyl - S - (1,2 - dicarbethoxyethyl)dithiophosphate (malathion), the carbonated carrier gave activity values above 91%, in contrast to the values for the uncarbonated reactant of no higher than 56%, in both accelerated and prolonged testing. Similar results were observed with a wide range of normally base-sensitive pesticides.

Base-sensitive pesticides are known to those skilled in the art to include esters that are susceptible to alkaline hydrolysis, chlorinated compounds that are subject to degradation by removal of HCl or $CHCl_3$ or the like, among others. Typical base-sensitive pesticides in addition to those specially mentioned heretofore are:

2,3,4,5,6,7,8,8-octachloro-4,7-methano-3α,4,7,7α-tetrahydroindane (chlordane)
1,1,1-trichloro-2,2-bis(p-chlorophenyl)ethane (DDT)
1,2,3,4,5,6-hexachlorocyclohexane (lindane)
Chlorinated camphene containing 67 to 69% chlorine (toxaphene)
2'-chloroethyl-1-methyl-2-(p-tert-butylphenoxy)ethyl sulfite (Aramite)
Ethyl 2-hydroxy-2,2-bis(4-chlorophenyl)acetate (chloro benzilate)
1,1-dichloro-2,2-bis(p-chlorophenyl)ethane (Rhothane)
1,1-dichloro-2,2-bis(p-ethylphenyl)ethane (Perthane)
1,1,1-trichloro-2,2-bis(p-methoxyphenyl)ethane (methoxychlor)

While the carbonated diatomaceous calcium silicate of this invention is generally useful with substantially all pesticides, its outstanding value lies in its use as a carrier for liquids or solids that are considered normally to be base sensitive. In such uses, the present carbonated carrier exhibits unexpectedly superior characteristics over those of the corresponding uncarbonated compositions.

This is a continuation-in-part of application Serial No. 679,146, filed August 20, 1957, now abandoned.

We claim:

1. A pesticidal formulation comprising a pesticide and, as a carrier therefor, a substantially insoluble intermolecular complex of calcium carbonate and silicon dioxide which contains from 7 to 25% by weight calculated as carbon dioxide, said carrier prepared by reacting carbon dioxide with a substantially insoluble diatomaceous calcium silicate in the presence of water.

2. A pesticidal formulation comprising a pesticide and, as a carrier therefor, a substantially insoluble intermolecular complex of calcium carbonate and silicon dioxide which contains from 7 to 25% by weight calculated as carbon dioxide, said carrier having a particle size of about 2.8 to about 4.1 microns, a bulk density of about 0.43 to about 0.54 gram per cubic centimeter, and a pH in an aqueous system of about 8.4 to about 8.8, said carrier prepared by reacting carbon dioxide with a substantially insoluble diatomaceous calcium silicate in the presence of water.

3. a pesticidal formulation comprising a base-sensitive pesticide and, as a carrier therefor, a substantially insoluble intermolecular complex of calcium carbonate and silicon dioxide which contains from 7 to 25% by weight calculated as carbon dioxide, said carrier having a particle size of about 2.8 to about 4.1 microns, a bulk density of about 0.43 to about 0.54 gram per cubic centimeter, and a pH in an aqueous system of about 8.4 to about 8.8, said carrier prepared by reacting carbon dioxide with a substantially insoluble diatomaceous calcium silicate in the presence of water.

4. A composition according to claim 2, which comprises about 49 to 84 parts of said carrier and about 15 to 50 parts of said pesticide.

5. A composition according to claim 2, which comprises about 64 to 79 parts of said carrier, 20 to 35 parts of said pesticide, and a total of 1 to 10 parts of at least the first member from the class consisting of a dispersing agent and a wetting agent.

6. A composition according to claim 5 in which there are employed both a dispersing agent and a wetting agent and in which the dispersing agent is in excess of the wetting agent.

7. A composition according to claim 2, in which said pesticide is 1,1-bis(chlorophenyl)-2,2,2-trichloroethanol.

8. A composition according to claim 2, in which said pesticide is 1,1-dichloro-2,2-bis(p-chlorophenyl)ethane.

9. A composition according to claim 2, in which said pesticide is 1,1-dichloro-2,2-bis(p-ethylphenyl)ethane.

10. A composition according to claim 2, in which said pesticide is dinitro(1-methylheptyl)phenyl crotonate.

11. A composition according to claim 2, in which said pesticide is O,O-dimethyl-S-(1,2-dicarbethoxyethyl)-dithiophosphate.

References Cited in the file of this patent
UNITED STATES PATENTS 2,314,188    Allen ------------------ Mar. 16, 1943

OTHER REFERENCES

Yost et al., Agricultural Chemicals 10:9, September 1955, pp. 43–45 and 137–139.

Watkins et al., Handbook of Insecticide Dust Diluents and Carriers, 1955, published by Dorland Books, Caldwell, N.J., pages 228 and 229.

De Ong, Chemistry and Uses of Pesticides, 1956, 2nd ed., published by Reinhold Publishing Corp., New York, pages 187–242 and particularly 187, 194, 196, 216, 217, 230 and 242.

JULIAN S. LEVITT, *Primary Examiner.*

MORRIS O. WOLK, *Examiner.*